US012673824B2

(12) United States Patent
Peng et al.

(10) Patent No.: US 12,673,824 B2
(45) Date of Patent: Jul. 7, 2026

(54) ORDER PROCESSING METHOD, DEVICE, WAREHOUSING SYSTEM, AND STORAGE MEDIUM

(71) Applicant: HAI ROBOTICS CO., LTD., Shenzhen (CN)

(72) Inventors: Yifan Peng, Shenzhen (CN); Xin Ai, Shenzhen (CN)

(73) Assignee: HAI ROBOTICS CO., LTD., Shenzhen (CN)

( * ) Notice: Subject to any disclaimer, the term of this patent is extended or adjusted under 35 U.S.C. 154(b) by 510 days.

(21) Appl. No.: 18/326,234

(22) Filed: May 31, 2023

(65) Prior Publication Data

US 2023/0322491 A1      Oct. 12, 2023

Related U.S. Application Data

(63) Continuation of application No. PCT/CN2021/133973, filed on Nov. 29, 2021.

(30) Foreign Application Priority Data

Dec. 16, 2020      (CN) .......................... 202011487959.4

(51) Int. Cl.
  B65G 1/04          (2006.01)
  B65G 1/137         (2006.01)
  G06Q 10/087        (2023.01)
(52) U.S. Cl.
  CPC ......... B65G 1/1378 (2013.01); G06Q 10/087 (2013.01)
(58) Field of Classification Search
  CPC ...... B65G 1/1378; B65G 1/04; B65G 1/1375; B65G 1/1373; G06Q 10/087
  See application file for complete search history.

(56) References Cited

U.S. PATENT DOCUMENTS 8,311,902 B2 * 11/2012 Mountz .............. G06Q 10/0875
                                                        700/226
9,495,656 B2 * 11/2016 Adler ................ H01L 21/67259
(Continued)

FOREIGN PATENT DOCUMENTS

CN       101706886 A      5/2010
CN       108416523 A      8/2018
(Continued)

OTHER PUBLICATIONS

International Search Report mailed Mar. 3, 2022; PCT/CN2021/133973 with English Translation.
(Continued)

*Primary Examiner* — Patrick H Mackey
(74) *Attorney, Agent, or Firm* — Slater Matsil, LLP

(57)      ABSTRACT

Embodiments of the present disclosure provide an order processing method, apparatus, and device, a c system, and a storage medium. The order processing method includes: in a case that a second order is detected and a priority of the second order is higher than a priority of at least one first order, obtaining a material container of a first order in a buffer area, where each of the at least one first order is an order that is currently being executed and whose execution is not completed, and the material container of the first order is at least one material container of material containers corresponding to the at least one first order; and determining a first transport strategy of the second order according to the material container of the first order and a requirement of the second order, so as to complete the second order according to the first transport strategy.

20 Claims, 7 Drawing Sheets

In a case that a second order is detected and a priority of the second order is higher than a priority of at least one first order, a material box of the first order in a buffer area is obtained — S301 a first transport strategy of the second order according to the material box of the first order and a requirement of the second order is determined, so as to complete the second order according to the first transport strategy — S302

(56)     References Cited

U.S. PATENT DOCUMENTS

| 10,822,170 B2 * | 11/2020 | Hance ................... G05D 1/021 |
|---|---|---|
| 11,562,320 B2 * | 1/2023 | Elazary ............... G06Q 10/087 |
| 2016/0101937 A1 | 4/2016 | Adler |
| 2020/0278667 A1 | 9/2020 | Voorhies et al. |
| 2020/0372452 A1 * | 11/2020 | Kim ................... G06Q 30/0643 |
| 2023/0121652 A1 * | 4/2023 | Francis ............. G06Q 30/0639 |
|  |  | 705/26.8 |
| 2023/0222442 A1 * | 7/2023 | Yu ........................ G06Q 10/087 |
|  |  | 705/28 |
| 2024/0054451 A1 * | 2/2024 | Song ................... G06Q 10/087 |
| 2024/0124237 A1 * | 4/2024 | Cao ........................ G06Q 10/08 |

FOREIGN PATENT DOCUMENTS

| CN | 109118137 A | 1/2019 |
|---|---|---|
| CN | 109472488 A | 3/2019 |
| CN | 110989582 A | 4/2020 |
| CN | 111694330 A | 9/2020 |
| CN | 111792259 A | 10/2020 |
| CN | 111792260 A | 10/2020 |
| CN | 112722675 A | 4/2021 |
| EP | 1331179 B1 | 10/2004 |

OTHER PUBLICATIONS

The Extended European Search Report dated May 14, 2024; Application No. 21905500.1, total pp. 7.

* cited by examiner

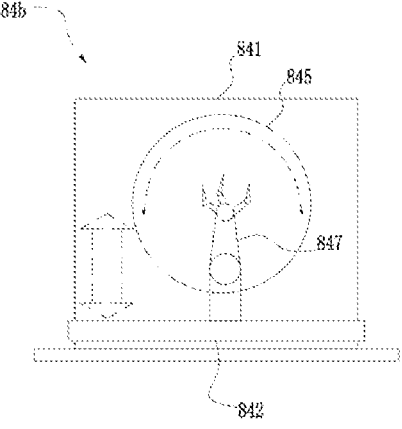

FIG. 2G

| In a case that a second order is detected and a priority of the second order is higher than a priority of at least one first order, a material box of the first order in a buffer area is obtained | S301 |

↓

| a first transport strategy of the second order according to the material box of the first order and a requirement of the second order is determined, so as to complete the second order according to the first transport strategy | S302 |

FIG. 3

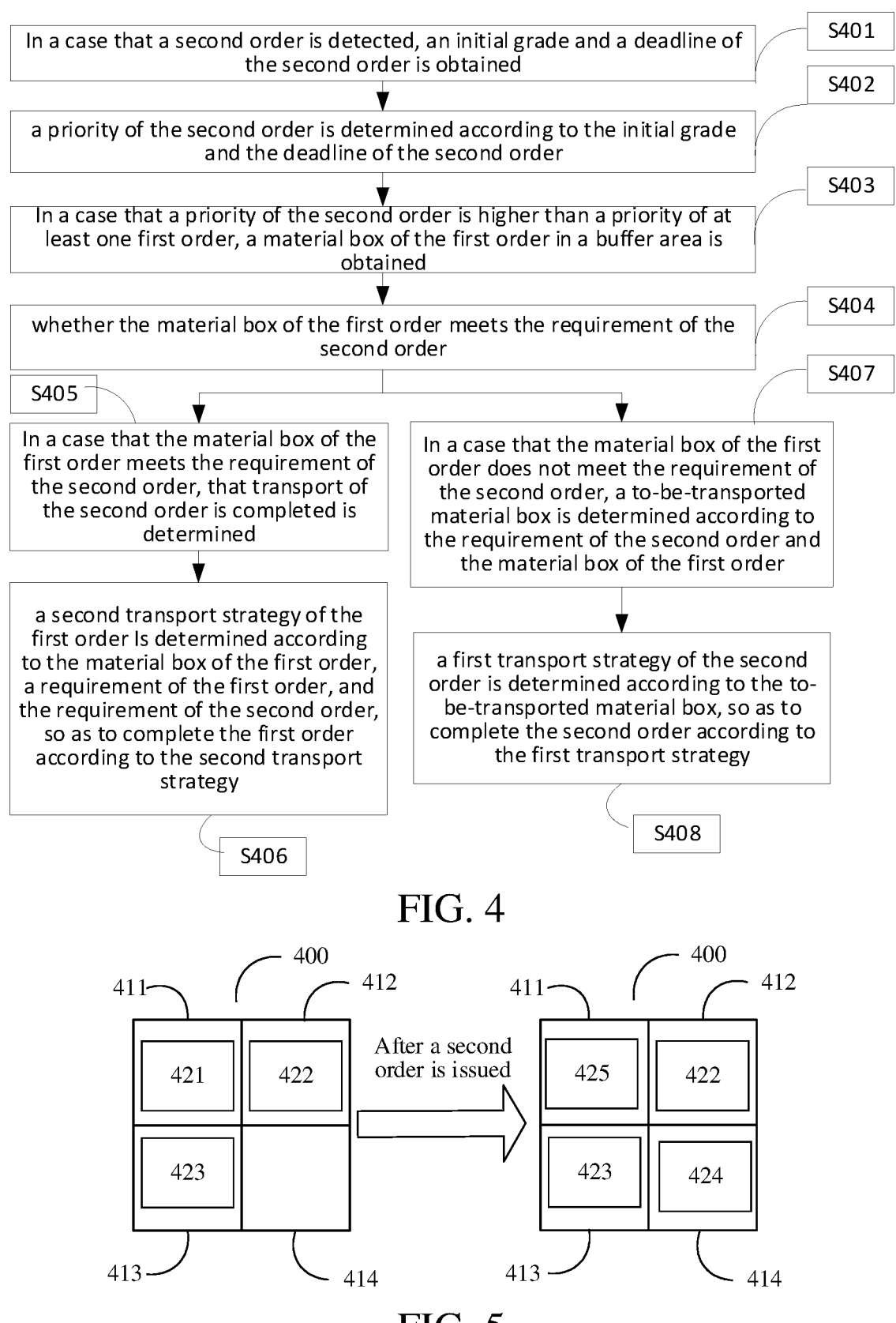

In a case that a second order is detected, an initial grade and a deadline of the second order is obtained — S401 a priority of the second order is determined according to the initial grade and the deadline of the second order — S402

In a case that a priority of the second order is higher than a priority of at least one first order, a material box of the first order in a buffer area is obtained — S403 whether the material box of the first order meets the requirement of the second order — S404

S405

In a case that the material box of the first order meets the requirement of the second order, that transport of the second order is completed is determined a second transport strategy of the first order Is determined according to the material box of the first order, a requirement of the first order, and the requirement of the second order, so as to complete the first order according to the second transport strategy — S406

S407

In a case that the material box of the first order does not meet the requirement of the second order, a to-be-transported material box is determined according to the requirement of the second order and the material box of the first order a first transport strategy of the second order is determined according to the to-be-transported material box, so as to complete the second order according to the first transport strategy — S408

After a second order is issued 400    411    412

First material box obtaining module

820

First transport strategy determining module

910

Memory

930

920

Processor

1030

1010

Robot

1020

1

ORDER PROCESSING METHOD, DEVICE, WAREHOUSING SYSTEM, AND STORAGE MEDIUM

CROSS-REFERENCE TO RELATED APPLICATIONS

This present disclosure is a continuation of International Patent Application No. PCT/CN2021/133973 filed on Nov. 29, 2021, which claims priority to Chinese Patent Application No. 202011487959.4, entitled "ORDER PROCESSING METHOD, APPARATUS, DEVICE, WAREHOUSING SYSTEM, AND STORAGE MEDIUM" and filed with the National Intellectual Property Administration, PRC on Dec. 16, 2020, which are incorporated herein by reference in their entirety.

TECHNICAL FIELD

The present disclosure relates to the technical field of intelligent storage, and in particular, to an order processing method, apparatus, device, a warehousing system, and a storage medium.

BACKGROUND

Robot-based intelligent warehousing systems can perform automatic pick up and storage of items through system instructions with intelligent operating systems for 24 hours, replace manual management and operation, improve the efficiency of warehousing, and have been widely used and favored.

An intelligent warehousing system often needs to sequentially deliver corresponding material containers or items in each order out of a warehouse according to each order. In the prior art, material containers of each order can be sequentially delivered only according to a fixed order designed in the system, and the order processing flexibility is poor and the requirement cannot be met.

SUMMARY

The present disclosure provides an order processing method, apparatus, and device, a warehousing system, and a storage medium. During order processing, a higher-priority order can be automatically prioritized according to a priority of each order, which improves the order processing flexibility.

According to a first aspect, an embodiment of the present disclosure provides an order processing method, applied to a warehousing system. The method includes: in a case that a second order is detected and a priority of the second order is higher than a priority of at least one first order, obtaining a material container of the first order in a buffer area, where the at least one first order is an order that is currently being executed and whose execution is not completed, and the material container of the first order is at least one material container of material containers corresponding to the first order; and determining a first transport strategy of the second order according to the material container of the first order and a requirement of the second order, so as to complete the second order according to the first transport strategy.

Optionally, the determining a first transport strategy of the second order according to the material container of the first order and a requirement of the second order includes: determining whether the material container of the first order meets the requirement of the second order; in a case that the material container of the first order does not meet the requirement of the second order, determining a to-be-transported material container according to the requirement of the second order and the material container of the first order; and determining the first transport strategy of the second order according to the to-be-transported material container.

Optionally, the order processing method further includes: in a case that the material container of the first order meets the requirement of the second order, determining that transport of the second order is completed; and determining a second transport strategy of the first order according to the material container of the first order, a requirement of the at least one first order, and the requirement of the second order, so as to complete the at least one first order according to the second transport strategy.

Optionally, the determining the first transport strategy of the second order according to the to-be-transported material container includes: determining a first target robot; determining a first priority of the first target robot according to the priority of the second order; and generating a first material container transport instruction of the first target robot according to material container information of the to-be-transported material container, so that the first target robot transports the to-be-transported material container based on the first priority and according to the first material container transport instruction.

Optionally, the order processing method further includes: determining whether a remaining slot in the buffer area is smaller than a required slot of the to-be-transported material container; if yes, according to a difference between the required slot and the remaining slot, determining a material container to be moved out of the buffer area, where the material container to be moved out is the material container of the first order that is located in the slot in the buffer area and that is not included in the requirement of the second order; generating a move-out instruction of the material container to be moved out, so that the robot can move, the material container to be moved out, out of the buffer area according to the move-out instruction; and after the material container to be moved out is moved out, generating a accommodating instruction of the to-be-transported material container, so as to accommodate the to-be-transported material container in the buffer area according to the accommodating instruction.

Optionally, the second order is an item pickup order, the requirement of the second order includes at least one to-be-picked-up item and a second quantity of the to-be-picked-up item, and the determining a first transport strategy of the second order according to the material container of the first order and a requirement of the second order includes: for each to-be-picked-up item, determining whether the material container of the first order includes the to-be-picked-up item; if not, generating the first transport strategy of the to-be-picked-up item according to the second quantity of the to-be-picked-up item; in a case that the material container of the first order includes the to-be-picked-up item, determining whether a first quantity of the to-be-picked-up item in the material container of the first order is less than the second quantity; and if yes, generating the first transport strategy of the to-be-picked-up item according to a difference between the first quantity and the second quantity.

Optionally, the order processing method further includes: in a case that the first quantity of the to-be-picked-up item is greater than or equal to the second quantity, generating a first sorting instruction of the to-be-picked-up item in the second order, so as to sort the second quantity of the to-be-picked-up item from the material container of the first order according to the first sorting instruction.

Optionally, the generating the first transport strategy of the to-be-picked-up item according to a difference between the first quantity and the second quantity includes: determining a target material container according to the difference between the first quantity and the second quantity of the to-be-picked-up item; determining a second target robot; determining a second priority of the second target robot according to the priority of the second order; and generating a second material container transport instruction of the second target robot according to material container information of the target material container, so that the second target robot transfers the target material container to the buffer area based on the second priority according to the second material container transport instruction.

Optionally, the method further includes: in a case that the first quantity of the to-be-picked-up item is smaller than the second quantity, generating a second sorting instruction of the to-be-picked-up item in the second order, so as to sort the first quantity of the to-be-picked-up item from the material container of the first order according to the second sorting instruction; and after a target material container is transported to the buffer area, generating a third sorting instruction of the target material container, so as to sort a substitute item corresponding to a difference between the first quantity and the second quantity from the target material container according to the third sorting instruction.

Optionally, the material container of the first order in the buffer area includes a material container of the first order on a buffer shelf and/or a material container of the first order in a storage unit of the third target robot.

Optionally, the material container of the first order in the buffer area is the material container of the first order in the storage unit of the third target robot, and a robot implementing the first transport strategy is a robot other than the third target robot.

Optionally, before obtaining the material container of the first order in the buffer area, the method further includes: obtaining an initial grade and a deadline of the second order; and determining the priority of the second order according to the initial grade and the deadline of the second order.

According to a second aspect, an embodiment of the present disclosure further provides an order processing apparatus. The apparatus includes: a first material container obtaining module, configured to: in a case that a second order is detected and a priority of the second order is higher than a priority of at least one first order, obtain a material container of a first order in a buffer area, where the at least one first order is an order that is currently being executed and whose execution is not completed, and the material container of the first order is at least one material container of material containers corresponding to the at least one first order; and a first transport strategy determining module, configured to determine a first transport strategy of the second order according to the material container of the first order and a requirement of the second order, so as to complete the second order according to the first transport strategy.

According to a third aspect, an embodiment of the present disclosure further provides an order processing device, including a memory and at least one processor. The memory stores computer-executable instructions; and the at least one processor is configured to execute the computer-executable instructions stored in the memory, so that the at least one processor executes the order processing method provided in any embodiment corresponding to the first aspect of the present disclosure.

According to a fourth aspect, an embodiment of the present disclosure further provides a warehousing system, including a robot, a shelf, and the order processing device provided in the embodiment corresponding to the third aspect of the present disclosure, where the robot is configured to pick up a material container corresponding to the instruction from the shelf according to an instruction of the order processing device.

According to a fifth aspect, an embodiment of the present disclosure further provides a computer readable storage medium, where the computer readable storage medium stores computer executable instructions, and when being executed by a processor, the computer executable instructions are used for implementing the order processing method provided in any embodiment corresponding to the first aspect of the present disclosure.

According to a sixth aspect, an embodiment of the present disclosure further provides a computer program product, including a computer program/instructions, the computer program/instructions, when executed by a processor, implementing the order processing method provided in any embodiment corresponding to the first aspect of the present disclosure According to the order processing method, apparatus, and device, the warehousing system, and the storage medium provided by the embodiments of the present disclosure, in a case that the higher-priority second order is detected in a process of processing the lower-priority first order, the transport strategy of the second order is formulated according to the material container of the first order and the requirement of the second order, to complete the second order. According to the order processing strategy provided in the present disclosure, the order does not need to be processed according to a specified order. Instead, according to the priority of the order, in a process of processing the lower-priority order, the higher-priority order is automatically processed first. This improves the order processing flexibility, ensures the processing efficiency of a higher-priority order, and improves user experience.

BRIEF DESCRIPTION OF THE DRAWINGS

The accompanying drawings herein are included in the specification and form a part of the specification, illustrate embodiments consistent with the present disclosure, and serve to explain the principles of the present disclosure together with the description.

FIG. 2G is a schematic structural diagram of another transport apparatus according to the embodiment shown in FIG. 2A of the present disclosure;

FIG. 3 is a flowchart of an order processing method according to an embodiment of the present disclosure;

FIG. 4 is a flowchart of an order processing method according to another embodiment of the present disclosure;

FIG. 5 is a schematic diagram of a buffer area according to the embodiment shown in FIG. 4 of the present disclosure;

Explicit embodiments in the present disclosure are shown by using the foregoing accompanying drawings, more detailed descriptions are provided below. These drawings and text description are not for limiting the scope of the concept of the present disclosure in any way, but for illustrating the concept of the present disclosure for those skilled in the art by referring to specific embodiments.

DETAILED DESCRIPTION

Exemplary embodiments are described in detail herein, and examples of the exemplary embodiments are shown in the accompanying drawings. When the following description involves the accompanying drawings, unless otherwise indicated, the same numerals in different accompanying drawings represent the same or similar elements. The implementations described in the following exemplary embodiments do not represent all implementations consistent with the present disclosure. On the contrary, the implementations are merely examples of apparatuses and methods that are described in detail in the appended claims and that are consistent with some aspects of this disclosure.

The technical solutions of the present disclosure and how the technical solutions solve the above technical problems are described in detail in the specific embodiments hereinafter. The following specific embodiments may be combined with each other, and the same or similar concepts or processes may not be described in some embodiments. The embodiments of the present disclosure are described below with reference to the accompanying drawings.

Application scenarios of the embodiments of the present disclosure are described below.

Figure 1:
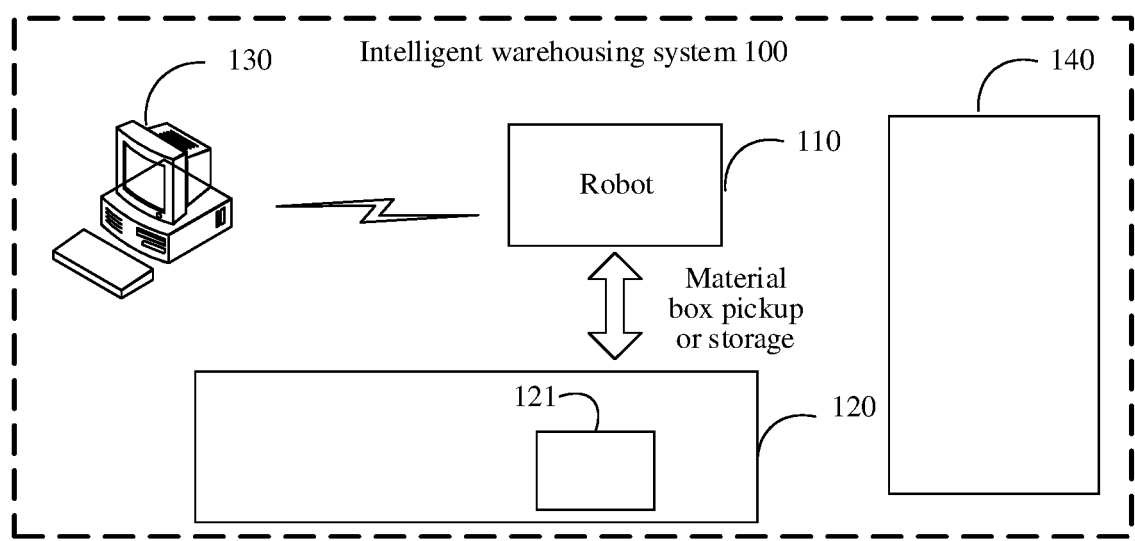
FIG. 1 is a diagram of an application scenario of an order processing method according to an embodiment of the present disclosure.

FIG. 1 is a diagram of an application scenario of an order processing method according to an embodiment of the present disclosure. As shown in FIG. 1, the order processing method provided by this embodiment of the present disclosure can run on an electronic device, such as a computer or a server, and can also be executed by a warehousing management device or by another device in a warehousing system. An intelligent warehousing system 100 uses a robot 110 to pick up and/or store a material container from a shelf 120, and uses a warehousing management device 130 to perform path planning, status monitoring and scheduling, and the like for the robot 110, so that the robot 110 moves to a specified position for picking up or storing a material container. The warehousing management device 130 also stores storage information of each storage space of the shelf 120 and basic information of a material container, so as to facilitate warehousing management. When there is an order task in the warehousing system 100, the robot 110 transports one or more material containers 121 corresponding to the order task on the shelf 120 to a buffer area 140, so as to complete the order task.

However, an existing order processing process can be processed only according to a pre-designed order, that is, a next order can be processed only after a previous order is completed. When there is an urgent order in the system, the urgent order can only be processed through human control, and order processing flexibility is poor.

To improve order processing flexibility, an embodiment of the present disclosure provides an order processing method. In a case that a next order is received when a previous order has not been completed, according to priorities of the orders, that is, when the priority of the next order is higher than that of the previous order, a transport strategy of the next order is determined according to a requirement of the next order and a material container of the previous order that has been transported to the buffer area, so as to first complete the higher-priority next order. This implements the priority-based processing method of order processing and improves order processing flexibility.

Figure 2A:
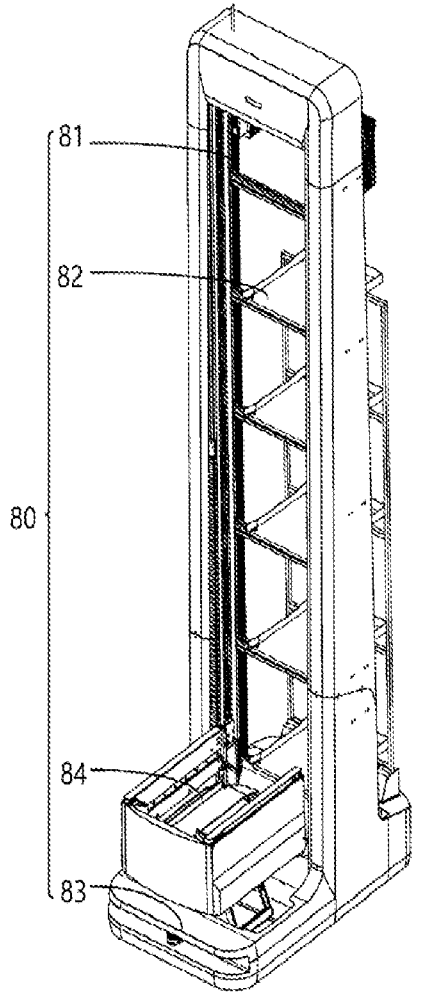
FIG. 2A is a schematic structural diagram of a robot according to an embodiment of the present disclosure.

FIG. 2A is a schematic structural diagram of a robot according to an embodiment of the present disclosure. As shown in FIG. 2A, a robot 80 includes a mobile chassis 83, a storage shelf 82, a transport apparatus 84, and a lifting component 81. The storage shelf 82, the transport apparatus 84, and the lifting component 81 are all installed on the mobile chassis 83, and several storage units are arranged on the storage shelf 82. The lifting component 81 is configured to drive the transport apparatus 84 to move upwards and downwards, so that the transport apparatus 84 is aligned with any storage unit on the storage shelf 82, or aligned with the shelf and/or an item. The transport apparatus 84 can rotate around the vertical direction as the axis to adjust the orientation, so as to be aligned with a storage unit, or aligned with the shelf and/or an item. The transport apparatus 84 is configured to load or unload an item to transfer the item between the shelf and the storage unit.

Exemplarily, the storage shelf 82 can be selectively configured or not configured, and when the storage shelf 82 is not configured, an item is stored in an accommodation space of the transport apparatus 84 when the robot 80 transports the item.

The robot 80 in the above-mentioned embodiment can perform steps related to material container transport in the order processing method provided by any embodiment of the present disclosure, so as to transport an item between the shelve, the buffer area, and an operating platform.

When the robot 80 performs a task of storing an item, the robot 80 moves to a position of a designated storage space for the item, and transports the target item from a storage unit of a robot body 81 to the shelf in cooperation with the transport apparatus 84 through an adjustment component, such as a rotating mechanism.

Figure 2B:
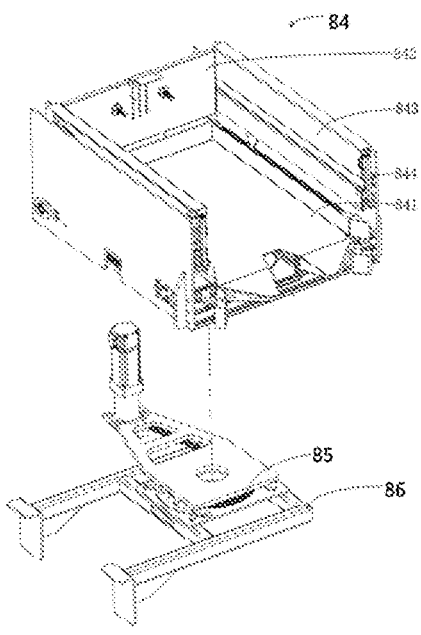
FIG. 2B is a schematic structural diagram of a transport apparatus according to the embodiment shown in FIG. 2A of the present disclosure.

Exemplarily, FIG. 2B is a schematic structural diagram of a transport apparatus according to the embodiment shown in FIG. 2A of the present disclosure.

Exemplarily, the transport apparatus 84 is mounted on a bracket 86 through a rotating mechanism 85, and the rotating mechanism 85 is configured to drive the transport apparatus 84 to rotate around a vertical axis relative to the bracket 86, so as to be aligned with the storage unit, or aligned with the shelf and/or an item. The transport apparatus 84 is configured to transport an item between the storage unit and the shelf. If the transport apparatus 84 is not aligned with the shelf and/or an item, the rotating mechanism 85 can drive the transport apparatus 84 to rotate relative to the bracket 86 to ensure that the transport apparatus 84 is aligned with the shelf and/or an item.

Figure 2C:
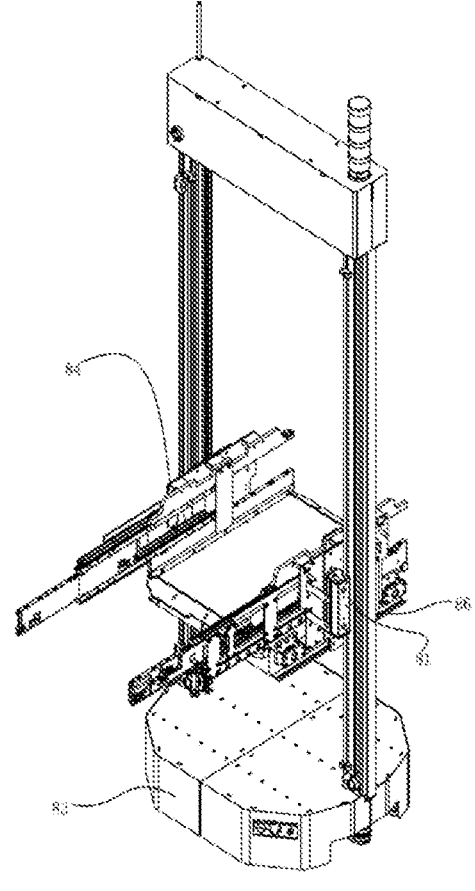
FIG. 2C shows structures of a robot and a transport apparatus thereof according to an in embodiment of the present disclosure.

FIG. 2C shows structures of a robot and a transport apparatus thereof according to an embodiment of the present disclosure. With reference to FIG. 2A and FIG. 2B, it can be understood that the rotating mechanism 85 can be omitted according to an actual case. For example, the transport robot 80 moves on a fixed track. After the robot 80 moves to the vicinity of the shelf, the transport apparatus 84 is always aligned with the shelf and/or an item, and the item is arranged on a pick-up direction of the transport apparatus 84.

Figure 2D:
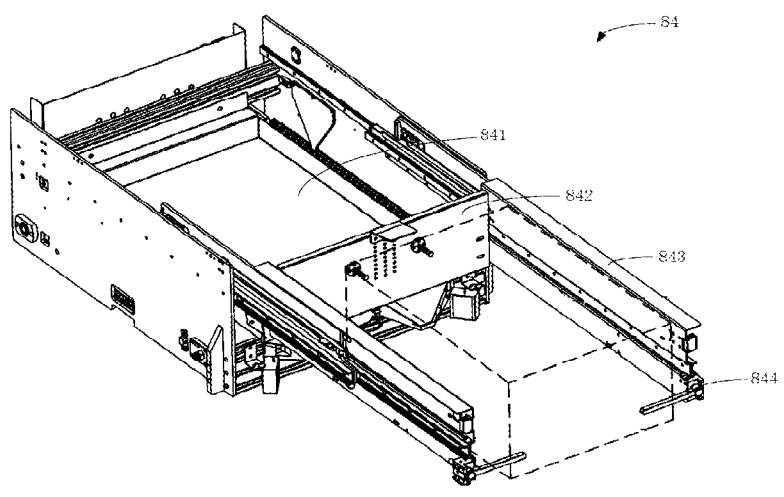
FIG. 2D is a schematic structural diagram of a transport apparatus according to the embodiment shown in FIG. 2A of the present disclosure.

Exemplarily, FIG. 2D is a schematic structural diagram of a transport apparatus according to an embodiment shown in FIG. 2A of the present disclosure. Refer to FIG. 2B to facilitate understanding. As shown in FIG. 2D, the transport apparatus 84 includes a pallet 841 and a telescopic arm component. The pallet 841 is configured to accommodate an item and can be a flat plate arranged horizontally. The telescopic arm component is configured to push an item accommodated on the pallet 841 out of the pallet 841 or pull an item to the pallet 841. The telescopic arm component includes a telescopic arm 843, a fixed push rod 842, and a movable push rod 844. The telescopic arm 843 includes a left telescopic arm and a right telescopic arm. The telescopic arm 843 can extend horizontally, and the telescopic arm 843 is located on one side of the pallet 841 in a direction perpendicular to an extending direction of the telescopic arm 843 and parallel to the pallet 841. The telescopic arm 843 is powered by a motor, and the power is transmitted by a sprocket mechanism. According to an actual case, the sprocket mechanism can be replaced by a driving mechanism such as a pulley mechanism or a screw mechanism for driving. Both the fixed push rod 842 and the movable push rod 844 are mounted on the telescopic arm 843, and the fixed push rod 842 and the movable push rod 844 can extend together with the telescopic arm 843. The fixed push rod 842 and the pallet 841 are located on the same side of the telescopic arm 843, and the fixed push rod 842 is configured to push an item out of the pallet 841 when the telescopic arm 843 extends. The movable push rod 844 can be received in the telescopic arm 843. When the movable push rod 844 is not received in the telescopic arm 843, the movable push rod 844, the fixed push rod 842, and the pallet 841 are all located on the same side of the telescopic arm 843, and the movable push rod 844 is located on an extending direction of the fixed push rod 842 along the telescopic arm 843. The movable push rod 844 can be directly driven by a motor, and according to an actual case, can also be powered by a transmission mechanism such as a gear set and a connecting rod mechanism. When the movable push rod 844 is not received in the telescopic arm 843 and the telescopic arm 843 is retracted, the movable push rod 844 is configured to pull the item to the pallet 841.

Exemplarily, the fixed push rod 842 of the transport apparatus 84 can be designed as a finger rod structure such as the movable push rod 844.

Exemplarily, the transport apparatus 84 may be designed as a structure in which a spacing width of the telescopic arm component is adjustable. During storing/picking up of an item, the spacing width of the telescopic arm component can be adjusted according to the size of the item.

Figure 2E:
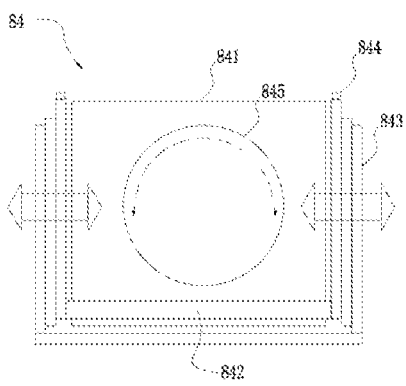
FIG. 2E is a schematic structural diagram of another transport apparatus according to the embodiment shown in FIG. 2A of the present disclosure.

Exemplarily, the transport apparatus 84 may also include a steering structure, such as a turntable, and the steering structure may be configured to change the orientation of an item accommodated on the pallet 841. FIG. 2E is a structural schematic diagram of another transport apparatus according to the embodiment shown in FIG. 2A of the present disclosure. With reference to FIG. 2E and FIG. 2D, it can be seen that the transport apparatus 84 may also include a steering structure, that is, a turntable 845 in FIG. 2E, to change the orientation of an item accommodated on the pallet 841.

Figure 2F:
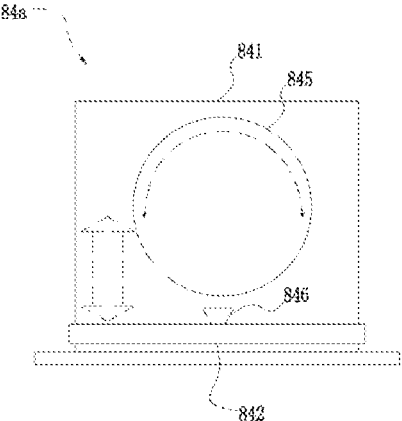
FIG. 2F is a schematic structural diagram of another transport apparatus according to the embodiment shown in FIG. 2A of the present disclosure.

Exemplarily, FIG. 2F is a schematic structural diagram of another transport apparatus according to the embodiment shown in FIG. 2A of the present disclosure. As shown in FIG. 2F, a transport apparatus 84a includes one or more suction cups 846 disposed on the fixed push rod 842, and the fixed push rod 842 may be rod-shaped or plate-shaped. When storing/picking up an item, the fixed push rod 842 can be driven to face towards the direction of the item and/or the shelf to make a displacement in a forward/reverse direction. The item is absorbed by the suction cup 846, and is transported to the shelf or the pallet 841 in cooperation with the displacement of the fixed push rod 842.

Exemplarily, FIG. 2G is a schematic structural diagram of another transport apparatus according to the embodiment shown in FIG. 2A of the present disclosure. As shown in FIG. 2G, a transport apparatus 84b includes one or more robotic arms 847 disposed at appropriate positions on the fixed push rod 842 and/or the transport apparatus 84b. When storing/picking up an item, the fixed push rod 842 can be driven to face towards the direction of the item and/or the shelf to make a displacement in a forward/reverse direction. The item is grabbed/hooked by the robotic arm 847, and is transported to the shelf or the pallet 841 in cooperation with the displacement of the fixed push rod 842.

Exemplarily, the transport apparatus (84a, 84b) may also include a steering structure, such as a turntable 845 in FIG. 2E and FIG. 2F, to change the orientation of the item accommodated on the pallet 841.

The structure of the transport apparatus of the embodiments shown in the present disclosure may include one or more combinations of the above examples.

FIG. 3 is a flowchart of an order processing method according to an embodiment of the present disclosure. As shown in FIG. 3, the order processing method may be executed by an order processing device or a warehousing management device of a warehousing system, specifically, a computer, a server, and the like. The order processing method provided in this embodiment includes operations in the following blocks:

In block S301: In a case that a second order is detected and a priority of the second order is higher than a priority of at least one first order, a material container of a first order in a buffer area is obtained.

The first order is an order that is currently being executed and whose execution is not completed. The material container of the first order is at least one material container of material containers corresponding to the first order. The second order is issued later than the first order. The first order or the second order may be an order task issued by a user or a system in a warehousing system, and may be a material container pickup order or an item pickup order. An object of a material container pickup order is a material container on the shelf of the warehousing system, and an object of an item pickup order is an item stored in a material container accommodated on the shelf of the warehousing system, such as clothes, a building material, or an electronic device.

A priority of each order can be set by a user, or can be determined according to a grade and/or a deadline of the order.

The buffer area may be an area used by the warehousing system to temporarily store a material container corresponding to each order. The buffer area may be an order wall or just a designated vacant space. The buffer area can also be called a working bench, and is configured to accommodate a material container corresponding to each order. The buffer area can include one or more slots, such as a warehousing position on the buffer shelf or a storage unit of a robot, and a material container or an item corresponding to an order can be accommodated in one slot or in multiple slots.

Optionally, the material container of the first order in the buffer area includes a material container of the first order on a buffer shelf and/or a material container of the first order in a storage unit of the third target robot.

The third target robot is one or more robots that transport the material container of the first order.

Optionally, the material container of the first order in the buffer area is the material container of the first order in the storage unit of the third target robot, and a robot implementing the first transport strategy is a robot other than the third target robot.

A robot implementing the first transport strategy may be a subsequent first target robot or second target robot.

The robot mentioned in this disclosure, that is, the first target robot, the second target robot, or the third target robot, may be the robot provided in any one of the embodiments corresponding to FIG. 2A to FIG. 2G.

Specifically, when the second order is detected, a status of the first order may not be completed, for example, the material container of the first order does not meet a requirement of the first order. The requirement of the first order is a task requirement of the first order. When the first order is a material container pickup order, the requirement of the first order can be each to-be-picked-up material container. When the first order is an item pickup order, the requirement of the first order can be each to-be-picked-up item and a quantity thereof.

Specifically, the first order is an order that is currently being executed. According to the first order requirement of the first order, the robot may transport one or more material containers of the first order to the buffer area.

Further, at least one robot may be determined according to a position, a size, and a quantity of each first order material container, and then the robot is controlled to transport each first order material container to the buffer area.

Exemplarily, the first order can be: picking up a material container A1, a material container B1, and a material container C1. The material container A1, the material container B1, and the material container C1 are all material containers of the first order, and the robot needs to transport the material container A1, the material container B1, and the material container C1 to a corresponding slot or a designated area in the buffer area.

Exemplarily, the first order can be: item a1: 10 pieces, item b1: 5 pieces, and item c1: 3 pieces. If the warehousing system determines, according to the requirement of the first order, that the material container of the first order that meets the requirement of the first order is a material container A2, a material container B2, and a material container C2, where the material container A2, the material container B2, and the material container C2 are all the material containers of the first order, the material container A2 accommodates 12 items a1, the material container B2 accommodates 5 items b1, and the material container C2 accommodates 5 items c1. The robot needs to transport the material container A2, the material container B2, and the material container C2 to the order wall, then sort out 10 items a1 from the material container A2, sort out 5 items b1 from the material container B2, and sort out 3 items c1 from the material container C2, and accommodate the 10 items a1, the 5 items b1, and the 3 items c1 in the designated slot in the buffer area, to complete the first order.

Specifically, a material container code of the material container of the first order in the buffer area can be obtained, so as to determine a storage status of the item in the material container of the first order according to the material container code, to determine, based on an item storage status of each first order material container, whether the material container of the first order meets the requirement of the first order. If yes, the requirement of the first order is completed; and if not, that is, when the material container of the first order does not meet the first order requirement of the first order, a first transport strategy of the second order is determined based on the material container of the first order and the requirement of the second order.

Specifically, the requirement of the first order may include each material container or each preset quantity of to-be-picked-up items required by the first order. That the material container of the first order does not meet the first order requirement of the first order means that the material containers of the first order in the buffer area do not include all material containers in the first order, or do not include all to-be-picked-up items, or a quantity of at least one to-be-picked-up item does not reach a preset quantity.

Exemplarily, it is assumed that the requirement of the first order is: a material container A3, a material container B3, a material container C3, and a material container D3, but the material containers of the first order in the current buffer area are: the material container A3, the material container B3, and the material container C3, and the material container D3 is not included. Therefore, the material container of the first order does not meet the first order requirement of the first order.

For example, it is assumed that the requirement of the first order is: item a2: 10 pieces, item b2: 10 pieces, and item c2: 10 pieces, and the material containers of the first order in the current buffer area are: a material container A4, a material container B4, and a material container C4, where the material container A4 includes 10 items a2, the material container B4 includes 10 items b2, the material container C4 includes 8 items c2, and the quantity of items c2 is insufficient. Therefore, the material container of the first order does not meet the first order requirement for the first order.

Specifically, in a case that the second order is detected and the priority of the second order is higher than that of the first order when the material container of the first order stored in the buffer area cannot meet the first order requirement of the first order, the second order needs to be completed firstly based on an execution status of the first order.

In block S302: a first transport strategy of the second order according to the material container of the first order and a requirement of the second order is determined, so as to complete the second order according to the first transport strategy.

The requirement of the second order represents a task requirement of the second order, and may include each to-be-picked-up item in the second order or each to-be-picked-up item in the second order and a quantity of each to-be-picked-up item. The first transport strategy may include one or more material containers that need to be transported, and one or more robots that perform the transport. The first transport strategy may also include a moving path of each robot.

Specifically, when the second order is a material container pickup order, one or more material containers of the second order that have not been transported to the buffer area are determined according to the material container of the first order and the requirement of the second order, and the first transport strategy is determined based on the material container of the second order.

Specifically, when the second order is an item pickup order, one or more to-be-picked-up items that have not been transported to the buffer area and to-be-picked-up items that have been transported to the buffer area but a quantity of the to-be-picked-up items does not meet the requirement of the second order are determined according to the material container of the first order and the requirement of the second order, and the first transport strategy is determined based on each to-be-picked-up item that does not meet the requirement of the second order and a quantity of to-be-picked-up items that still need to be transported.

According to the order processing method provided by this embodiment of the present disclosure, in a case that the higher-priority second order is detected in a process of processing the lower-priority first order, the transport strategy of the second order is formulated according to the material container of the first order and the requirement of the second order, to complete the second order. According to the order processing strategy provided in the present disclosure, the order does not need to be processed according to a specified order. Instead, according to the priority of the order, in a process of processing the lower-priority order, the higher-priority order is automatically processed first. This improves the order processing flexibility, ensures the processing efficiency of a higher-priority order, and improves user experience.

FIG. 4 is a flowchart of an order processing method according to another embodiment of the present disclosure. Based on the embodiment shown in FIG. 3, the order processing method provided in this embodiment further provides details on step S302, and adds a step of determining the priority of the second order before step S301. As shown in FIG. 4, the order processing method provided in this embodiment includes operations in the following blocks:

In block S401: In a case that a second order is detected, an initial grade and a deadline of the second order is obtained.

The initial grade of the second order can be set by a user, or can be determined by a warehousing system according to a type of a material container or an item corresponding to the second order. The deadline refers to the latest time at which the second order needs to be completed, such as 12 am on Oct. 17, 2020.

Specifically, the initial grade of the second order may be determined according to the popularity of a material container or an item corresponding to the second order. For example, a correspondence between popularity and an initial grade is established in advance, and then the initial grade of the second order is determined according to the popularity of the second order. The popularity can be a value between 0 and 100, and can also be described by a percentage. Higher popularity indicates a higher corresponding initial grade.

Specifically, the initial grade may include a preset quantity of grades, such as 3, 5, 8, 10 or other numerical values.

Exemplarily, assuming that the full score of popularity is 100 and the highest initial grade is grade 10, if the popularity of the material container or the item corresponding to the second order is 50, the initial grade of the second order is 5.

In block S402: the priority of the second order is determined according to the initial grade and the deadline of the second order.

Specifically, the priority of the second order may be determined based on a preset relational expression according to the initial grade and the deadline of the second order. When the initial grade of the second order is higher and the deadline is closer to the current time, the priority of the second order is higher.

Exemplarily, assuming that the initial grade of the second order is a grade 3 and the deadline of the second order differs from the current time by 60 minutes, the priority of the second order is level 4. Assuming that the initial grade of the second order is grade 3 and the deadline of the second order differs from the current time by 100 minutes, the priority of the second order is level 3.

Exemplarily, the preset relational expression may be:

$$P_2 = P_0 + T_{th}/\Delta T$$

where $P_2$ represents a priority score of the second order, $P_0$ represents the initial grade of the second order, $\Delta T$ is a difference between the deadline of the second order and the current time, and $T_{th}$ is a preset time threshold and can be 100 min, 60 min, 50 min, or other values. Therefore, the priority of the second order may be determined according to a range of the priority score of the second order. If the priority score of the second order is between 0 and 2, the priority of the second order is determined as level one; if the priority score of the second order is between 2 and 4, the priority of the second order is determined as level two; if the priority score of the second order is between 4 and 6, the priority of the second order is determined as level 3; if the priority score of the second order is between 6 and 8, the priority of the second order is determined as level 4; and if the priority score of the second order is between 8 and 10, the priority of the second order is determined as level five.

In block S403: In a case that a priority of the second order is higher than a priority of at least one first order, a material container of the first order in a buffer area is obtained.

In block S404: whether the material container of the first order meets the requirement of the second order is determined.

Specifically, when the second order is a material container pickup order, the requirement of the second order includes each to-be-picked box of the second order, and it can be determined, according to whether the material container of the first order includes each to-be-picked box of the requirement of the second order, whether the material container of the first order in the buffer area meets the second order requirement of the second order. When the second order is an item pickup order, the requirement of the second order includes each to-be-picked-up item of the second order and a quantity of the to-be-picked-up item. Then, it can be determined, according to the item stored in the material container of the first order and a quantity of the item, whether the material container of the first order in the buffer area meets the requirement of the second order of the second order.

Exemplarily, assuming that the requirement of the second order is 10 pieces of clothes A and the material container of the first order includes 2 material containers accommodating 8 pieces of clothes A each, it is determined that the material container of the first order meets the requirement of the second order.

In block S405: In a case that the material container of the first order meets the requirement of the second order, that transport of the second order is completed is determined.

Specifically, when the material container of the first order in the buffer area meets the requirement of the second order, that is, the second order can be completed based on each material container corresponding to the first order in the buffer area, each material container of the second order is determined or a corresponding quantity of items in the second order are picked up based on the requirement of the second order, so as to complete the second order.

Specifically, when the second order is a material container pickup order and a material container of the first order is a to-be-picked-up material container in the requirement of the second order, the material container of the first order is accommodated in a slot of the buffer area corresponding to the second order. When each to-be-picked-up material container corresponding to the second order is accommodated in the corresponding slot, the second order is completed. When the second order is an item pickup order and the material container of the first order meets the requirement of the second order, the second quantity of to-be-picked-up items corresponding to each to-be-picked-up item are sorted from the material container of the first order to the slot of the buffer area corresponding to the second order. In this case, the second order is completed.

In block S406: a second transport strategy of the first order is determined according to the material container of the first order, a requirement of the first order, and the requirement of the second order, so as to complete the first order according to the second transport strategy.

Specifically, after the second order is completed, since the material container of the first order in the buffer area that meets the requirement of the first order has been used to complete the second order, each material container that needs to be transported to complete the first order needs to be determined according to the material container of the first order in the current buffer area, the requirement of the first order, and the requirement of the second order. Then, a corresponding second transport strategy is formulated to transport each required material container to the buffer area, so as to complete the material container of the first order.

Further, the material container that still needs to be transported in the first order can be determined according to the material container of the first order, the requirement of the first order, and the requirement of the second order, and then the second transport strategy is determined according to information such as a location and a size of the material container that still needs to be transported.

Exemplarily, it is assumed that there are three first order material containers in the buffer area currently: a material container 41 to a material container 43, the requirement of the first order is the material container 41 to a material container 44, and the requirement of the second order is the material container 42 and the material container 43. Then, it can be determined that the material container of the first order in the current buffer area is sufficient to complete the second order. At this time, the material container of the first order that corresponds to the buffer area and that is used for completing the first order is only the material container 41. Then, according to the requirement of the first order, it is determined that the material container 42 to the material container 44 further need to be transported. Therefore, the second transport strategy is determined according to information such as locations and sizes of the material container 42 to the material container 44, to transport the material container 42 to the material container 44 to the buffer area, so as to complete the first order.

In block S407: In a case that the material container of the first order does not meet the requirement of the second order, a to-be-transported material container is determined according to the requirement of the second order and the material container of the first order.

The to-be-transported material container and the material container of the first order can meet the requirement of the second order. A quantity of to-be-transported material containers can be one or multiple, which needs to be determined according to a difference between the requirement of the second order and the material container of the first order.

Specifically, when the second order is a material container pickup order, the to-be-transported material container is a remaining material container of the second order except the material container of the first order in the requirement of the second order. The to-be-transported material container is a material container that corresponds to a corresponding item in the requirement of the second order and that is not included in the material container of the first order, and a material container that corresponds to an item, where a quantity of the item in the material container of the first order is less than a quantity of the item in the requirement of the second order.

Exemplarily, assuming that the requirement of the second order is 10 pieces of clothes B and 6 pieces of clothes C and the material container of the first order includes 8 pieces of clothes B, there are still 2 pieces of clothes B and 6 pieces of clothes C are needed. Then, one or more material containers that satisfy 2 pieces of clothes B and 6 pieces of clothes C are determined as to-be-transported material containers.

Optionally, when a quantity of to-be-transported material containers is large, it also needs to be determined whether the remaining slot in the buffer area is sufficient. After the to-be-transported material container is determined, the method further includes: determining whether a remaining slot in the buffer area is smaller than a required slot of the to-be-transported material container; if yes, according to a difference between the required slot and the remaining slot, determining a material container to be moved out of the buffer area, where the material container to be moved out is the material container of the first order that is located in the slot in the buffer area and that is not included in the requirement of the second order; generating a move-out instruction of the material container to be moved out, so that the robot can move, the material container to be moved out, out of the buffer area according to the move-out instruction; and after the material container to be moved out is moved out, generating a accommodating instruction of the to-be-transported material container, so as to accommodate the to-be-transported material container in the buffer area according to the accommodating instruction.

The remaining slot in the buffer area is a slot in the buffer area that is not occupied by a material container or an item. The slot can be a warehousing position of the shelf, a vacant area of the buffer area, an unoccupied storage unit of a robot in the buffer area, or the like. Usually, one slot corresponds to one material container. If a physical space and safety allow, one slot can correspond to multiple material containers, and the multiple material containers are material containers corresponding to a same order as much as possible.

Specifically, when multiple to-be-transported material containers need to be transported to the buffer area and the remaining slot in the buffer area is insufficient to accommodate the multiple to-be-transported material containers, a material container to be moved out of the buffer area needs to be determined according to a difference between the required slot and the remaining slot, so as to move, the material container to be moved out, out of the buffer area, so that the multiple to-be-transported material containers are accommodated in each idle slot in the buffer area.

Specifically, the move-out instruction and the accommodating instruction may be executed by different robots.

Exemplarily, FIG. 5 is a schematic diagram of a buffer area according to the embodiment shown in FIG. 4 of the present disclosure. As shown in FIG. 5, a buffer area 400 includes 4 slots: a slot 411, a slot 412, a slot 413, and a slot 414. Each slot can only accommodate one material container. The requirement of the first order is a material container 421, a material container 422, a material container 423, and a material container 424. Before the second order is issued, the slot 411, the slot 412, and the slot 413 respectively accommodate the material container 421, the material container 422, and the material container 423. The requirement of the second order is the material container 422, the material container 423, the material container 424, and the material container 425. Then, the material container 424 and the material container 425 need to be accommodated in two slots of the buffer area 400. However, at this time, the buffer area 400 has only one slot left, that is, the slot 414. Then, the material container 421 (the material container to be moved out) needs to be moved out of the slot 411, so that the material container 424 and the material container 425 are accommodated in the slot 411 and the slot 414.

In the block S408: a first transport strategy of the second order is determined according to the to-be-transported material container, so as to complete the second order according to the first transport strategy.

Specifically, the first transport strategy may be determined according to the location of each to-be-transported material container. A transport instruction is generated according to the first transport strategy, so that a related robot transports each to-be-transported material container to the buffer area according to the transport instruction, so as to complete the second order.

Optionally, the determining the first transport strategy of the second order according to the to-be-transported material container includes:

determining a first target robot; determining a first priority of the first target robot according to the priority of the second order; and generating a first material container transport instruction of the first target robot according to material container information of the to-be-transported material container, so that the first target robot transports the to-be-transported material container based on the first priority according to the first material container transport instruction.

Specifically, one or more first target robots may be determined according to parameters such as a working status of each robot, a distance to a workstation, a distance to the to-be-transported material container, and a quantity and sizes of storage units of the robot. The first target robot is preferentially an idle robot.

Specifically, after the first target robot is determined, the first priority of the first target robot needs to be determined according to the priority of the second order, so as to avoid path conflicts with other robots based on the first priority.

Further, a path of the first target robot can be determined according to a position of the first target robot and a position of the to-be-transported material container. When there is a path conflict between another robot and the first target robot in a specified road section, path planning may be performed again for the first target robot to avoid the path conflict. Alternatively, when the first priority of the first target robot is higher than that of another robot, the another robot is controlled to stop running before reaching the specified road section. When the first priority of the first target robot is lower than that of another robot, the first target robot is controlled to stop running before reaching the specified road section, thus avoiding the path conflict between the robots.

In this embodiment, in a case that the second order is received and the priority of the second order is higher than that of the first order when the corresponding first order material container is transported according to the related requirement of the first order, it is determined whether the material container of the first order currently accommodated in the buffer area can meet the requirement of the second order. If yes, the second order is completed according to the requirement of the second order and the material container of the first order, to continue to complete the first order. If the material container of the first order cannot meet the requirement of the second order, the to-be-transported material container is determined according to the requirement of the second order and the material container of the first order, so as to transport the to-be-transported material container to the buffer area, to complete the second order. According to the order processing strategy provided in the present disclosure, the order does not need to be processed according to a specified order. Instead, according to the priority of the order, in a process of processing the lower-priority order, the higher-priority order is processed first. This improves order processing flexibility, ensures the processing efficiency of a higher-priority order, and improves user experience.

Figures 6, 7:
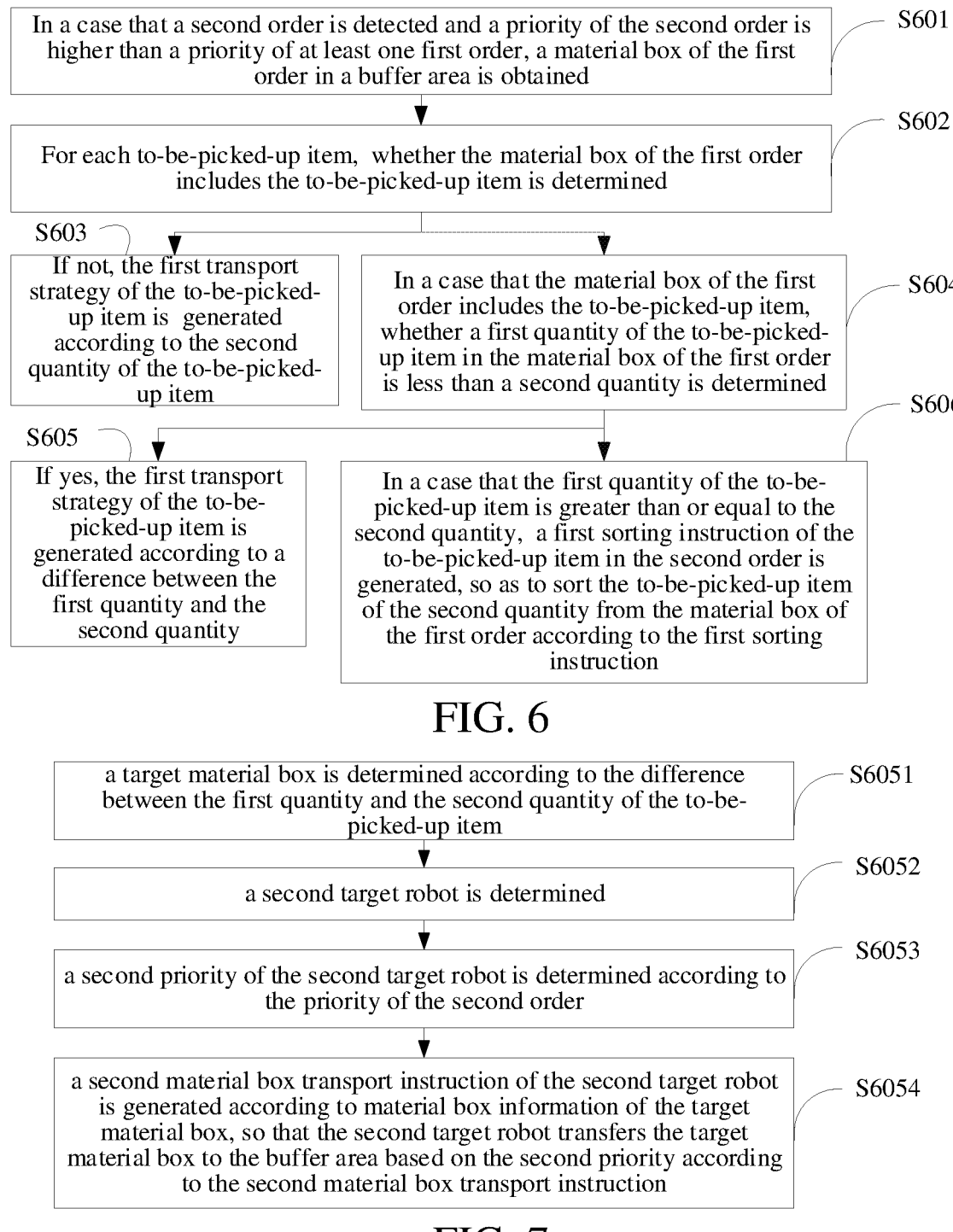
FIG. 6 is a flowchart of an order processing method according to another embodiment of the present disclosure.
FIG. 7 is a flowchart of step S605 according to the embodiment shown in FIG. 6 of the present disclosure.

FIG. 6 is a flowchart of an order processing method according to another embodiment of the present disclosure. The second order in this embodiment is an item pickup order, and the requirement of the second order includes at least one to-be-picked-up item and a second quantity of the to-be-picked-up item. Based on the embodiment shown in FIG. 3, the order processing method provided in this embodiment further provides details on step S302. As shown in FIG. 6, the order processing method provided in this embodiment includes operations of the following blocks:

In block S601: In a case that a second order is detected and a priority of the second order is higher than a priority of at least one first order, a material container of the first order in a buffer area is obtained.

In block S602: For each to-be-picked-up item, whether the material container of the first order includes the to-be-picked-up item is determined.

The to-be-picked-up item is one or more items that need to be picked up and that correspond to the second order, and may be any item, such as clothes, building materials, and cosmetics.

Step S603: If not, generate the first transport strategy of the to-be-picked-up item according to the second quantity of the to-be-picked-up item.

Specifically, if the material container of the first order in the buffer area includes the to-be-picked-up item, a second quantity of the to-be-picked-up item corresponding to the to-be-picked-up item needs to be picked up, that is, a quantity of the to-be-picked-up item that is picked up is the second quantity.

Exemplarily, if the requirement of the second order is 2 cosmetics A, but the material container of the first order only includes 1 cosmetic B, it can be known that the material container of the first order does not include the cosmetic A. Therefore, 2 cosmetics A need to be picked up.

In block S604: In a case that the material container of the first order includes the to-be-picked-up item, whether a first quantity of the to-be-picked-up item in the material container of the first order is less than the second quantity is determined.

Specifically, when the to-be-picked-up item is accommodated in the material container of the first order, it is determined whether the first quantity of the to-be-picked-up item included in the material container of the first order is less than the second quantity corresponding to the to-be-picked-up item, that is, it is determined whether a sufficient quantity of the to-be-picked-up item is included in the material container of the first order.

Exemplarily, if the requirement of the second order is 3 cosmetics A and 4 cosmetics B, but the first order box only includes 2 cosmetics B, it can be known that the first order box does not include the cosmetic A, and the quantity of cosmetics B is smaller than the second quantity required by the second order. Therefore, 3 cosmetics A and 2 cosmetics B need to be picked up.

In block S605: If yes, the first transport strategy of the to-be-picked-up item is generated according to a difference between the first quantity and the second quantity.

Specifically, when the first quantity of the to-be-picked-up item in the material container of the first order is less than the second quantity of the to-be-picked-up item required in the second order, it is determined that a quantity of the to-be-picked-up item that is picked up is a difference between the first quantity and the second quantity. Then, the first transport strategy of each to-be-picked-up item is determined according to the quantity of each to-be-picked-up item that is picked up.

Further, the transport strategy of the second order may also be determined according to the first transport strategy of each to-be-picked-up item.

Optionally, FIG. 7 is a flowchart of operation in block S605 according to the embodiment shown in FIG. 6 of the present disclosure. As shown in FIG. 7, operation in block S605 includes operations in the following block:

In block S6051: a target material container is determined according to the difference between the first quantity and the second quantity of the to-be-picked-up item.

The target material container may be one or more material containers accommodated on the shelf, and a quantity of to-be-picked-up items included in the target material container is at least the difference between the first quantity and the second quantity.

In block S6052: a second target robot determined.

Specifically, the second target robot may be determined according to a position, a size, and a quantity of the target material container. Steps of determining the second target robot are similar to the steps of determining the first target robot, and will not be repeated herein.

In block S6053: a second priority of the second target robot is determined according to the priority of the second order.

In block S6054: a second material container transport instruction of the second target robot is generated according to material container information of the target material container, so that the second target robot transfers the target material container to the buffer area based on the second priority according to the second material container transport instruction.

Optionally, the method further includes: in a case that the first quantity of the to-be-picked-up item is less than the second quantity, generating a second sorting instruction of the to-be-picked-up item in the second order, so as to sort the to-be-picked-up item of the first quantity from the material container of the first order according to the second sorting instruction; and after a target material container is transported to the buffer area, generating a third sorting instruction of the target material container, so as to sort a substitute item corresponding to a difference between the first quantity and the second quantity from the target material container according to the third sorting instruction.

Specifically, the second sorting instruction is used to sort out the first quantity of to-be-picked-up items included in the material container of the first order, and the third sorting instruction is used to sort out the to-be-picked-up item included in the target material container. A specific sorting quantity is the difference between the first quantity and the second quantity, so as to obtain the second quantity of to-be-picked-up items in the second order.

In block S606: In a case that the first quantity of the to-be-picked-up item is greater than or equal to the second quantity, a first sorting instruction of the to-be-picked-up item in the second order is generated, so as to sort the to-be-picked-up item of the second quantity from the material container of the first order according to the first sorting instruction.

Specifically, when the quantity of to-be-picked-up items in the material container of the first order is greater than or equal to the quantity required by the second order, that is, the first quantity is greater than or equal to the second quantity, the first sorting instruction is generated to sort out the second quantity of to-be-picked-up items from the material container of the first order.

In this embodiment, when the second order is an item pickup order, if a higher-priority second order is detected when the first order is being executed, the execution of the first order is suspended. For each to-be-picked-up item of the second order, it is determined whether the material container of the first order accommodated in the buffer area includes the to-be-picked-up item and whether the quantity meets a condition, so as to obtain the transport strategy of each to-be-picked-up item, to complete the second order. At the same time, the material container of the first order in the buffer area and the target material container subsequently transported are sorted to obtain each to-be-picked-up item required by the second order, so as to complete the second order. According to the order processing strategy provided in the present disclosure, the order does not need to be processed according to a specified order. Instead, according to the priority of the order, in a process of processing the lower-priority order, the higher-priority order is processed first. This improves the order processing flexibility, ensures the processing efficiency of a higher-priority order, and improves user experience.

Figures 8, 9, 10:
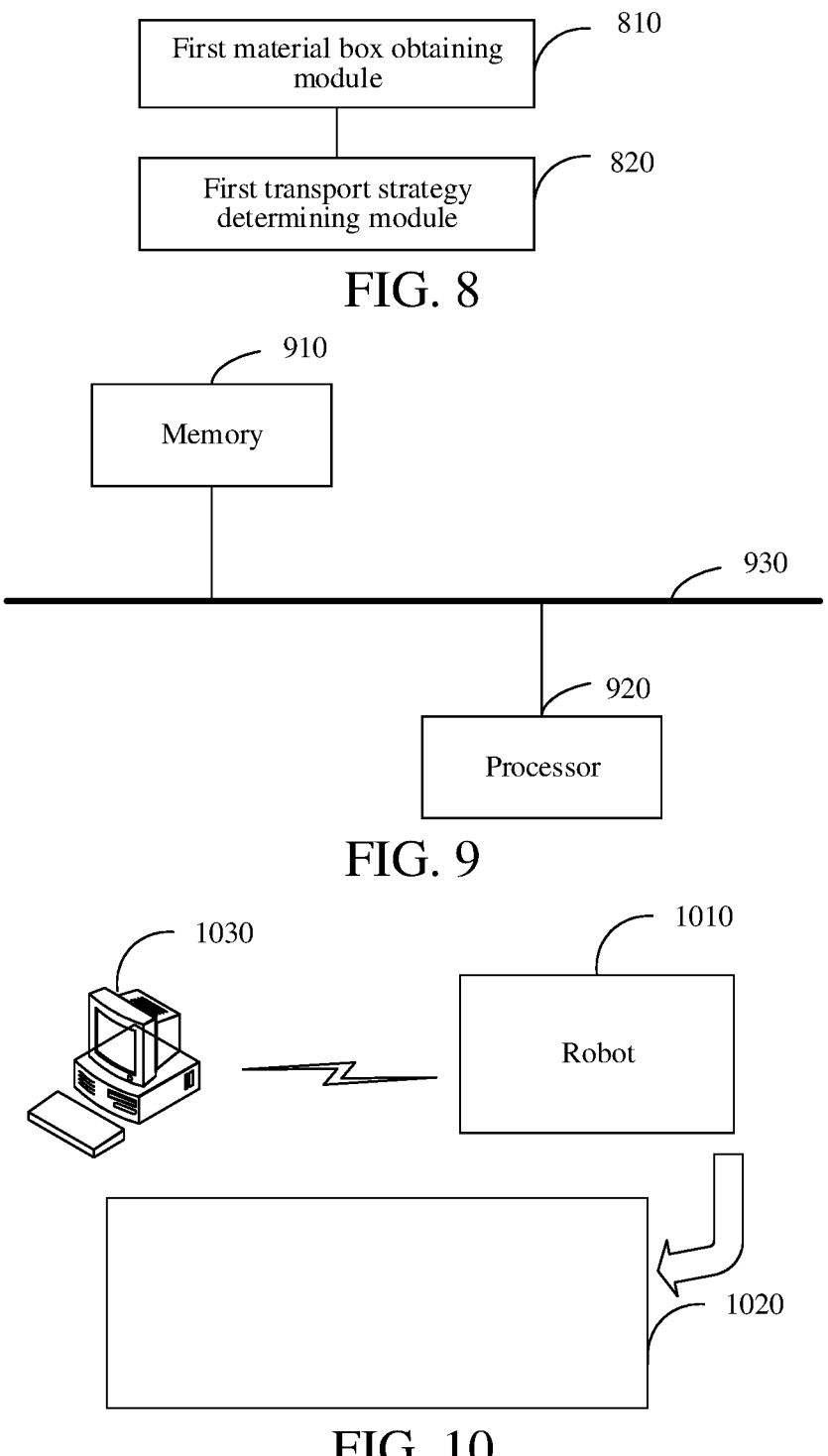
FIG. 8 is a schematic structural diagram of an order processing apparatus according to an embodiment of the present disclosure.
FIG. 9 is a schematic structural diagram of an order processing device according to an embodiment of the present disclosure.
FIG. 10 is a schematic structural diagram of a warehousing system according to an embodiment of the present disclosure.

FIG. 8 is a schematic structural diagram of an order processing apparatus according to an embodiment of the present disclosure. As shown in FIG. 8, the order processing apparatus includes: a first material container obtaining module 810 and a first transport strategy determining module 820.

The first material container obtaining module 810 is configured to: in a case that a second order is detected and a priority of the second order is higher than a priority of at least one first order, obtain a material container of the first order in a buffer area, where the at least one first order is an order that is currently being executed and whose execution is not completed, and the material container of the first order is at least one material container of material containers corresponding to the first order; and the first transport strategy determining module 820 is configured to determine a first transport strategy of the second order according to the material container of the first order and a requirement of the second order, so as to complete the second order according to the first transport strategy.

According to the order processing apparatus provided by this embodiment of the present disclosure, in a case that the higher-priority second order is detected in a process of processing the lower-priority first order, the transport strategy of the second order is formulated according to the material container of the first order and the requirement of the second order, to complete the second order. According to the order processing strategy provided in the present disclosure, the order does not need to be processed according to a specified order. Instead, according to the priority of the order, in a process of processing the lower-priority order, the higher-priority order is automatically processed first. This improves the order processing flexibility, ensures the processing efficiency of a higher-priority order, and improves user experience.

Optionally, the first transport strategy determining module 820 includes: a requirement determining unit, configured to determine whether the material container of the first order meets the requirement of the second order; a to-be-transported material container determining unit, configured to: in a case that the material container of the first order does not meet the requirement of the second order, determine a to-be-transported material container according to the requirement of the second order and the material container of the first order; and a first transport strategy determining unit, configured to determine the first transport strategy of the second order according to the to-be-transported material container.

Optionally, the order processing apparatus further includes: a second order completion determining module, configured to: in a case that the material container of the first order meets the requirement of the second order, determine that transport of the second order is completed; and a second transport strategy determining module, configured to determine a second transport strategy of the first order according to the material container of the first order, a requirement of the first order, and the requirement of the second order, so as to complete the first order according to the second transport strategy.

Optionally, the first transport strategy determining unit is specifically configured to: determine a first target robot; determine a first priority of the first target robot according to the priority of the second order; and generate a first material container transport instruction of the first target robot according to material container information of the to-be-transported material container, so that the first target robot transports the to-be-transported material container based on the first priority according to the first material container transport instruction.

Optionally, the order processing apparatus further includes: a remaining slot determining module, configured to determine whether a remaining slot in the buffer area is smaller than a required slot of the to-be-transported material container; a to-be-transported material container determining module, configured to: if the remaining slot is smaller than the required slot, according to a difference between the required slot and the remaining slot, determining a material container to be moved out of the buffer area, where the material container to be moved out is the material container of the first order that is located in the slot in the buffer area and that is not included in the requirement of the second order; a move-out instruction generation module, configured to generate a move-out instruction of the material container to be moved out, so that the robot can move, out of the buffer area according to the move-out instruction, the material container to be moved out; and an accommodating instruction generation module, configured to: after the material container to be moved out is moved out, generate an accommodating instruction of the to-be-transported material container, so as to accommodate the to-be-transported material container in the buffer area according to the accommodating instruction.

Optionally, the second order is an item pickup order, the requirement of the second order includes at least one to-be-picked-up item and a second quantity of the to-be-picked-up item, and the first transport strategy determining unit includes: a to-be-picked-up item determining subunit, configured to: for each to-be-picked-up item, determine whether the material container of the first order includes the to-be-picked-up item; a first transport strategy generation subunit, configured to: in a case that the material container of the first order does not include the to-be-picked-up item, generate the first transport strategy of the to-be-picked-up item according to the second quantity of the to-be-picked-up item; and a first quantity determining subunit, configured to: in a case that the material container of the first order includes the to-be-picked-up item, determine whether a first quantity of the to-be-picked-up item in the material container of the first order is less than the second quantity. The first transport strategy generation subunit is further configured to: in a case that the first quantity is less than the second quantity, generate the first transport strategy of the to-be-picked-up item according to a difference between the first quantity and the second quantity.

Optionally, the first transport strategy generation subunit is specifically configured to: determine a target material container according to the difference between the first quantity and the second quantity of the to-be-picked-up item; determine a second target robot; determine a second priority of the second target robot according to the priority of the second order; generate a second material container transport instruction of the second target robot according to material container information of the target material container, so that the second target robot transfers the target material container to the buffer area based on the second priority according to the second material container transport instruction.

Optionally, the order processing apparatus further includes: a first sorting instruction generation module, configured to: in a case that the first quantity of the to-be-picked-up item is greater than or equal to the second quantity, generate a first sorting instruction of the to-be-picked-up item in the second order, so as to sort the to-be-picked-up item of the second quantity from the material container of the first order according to the first sorting instruction.

Optionally, the apparatus further includes: a second sorting instruction generation module, configured to: in a case that the first quantity of the to-be-picked-up item is less than the second quantity, generating a second sorting instruction of the to-be-picked-up item in the second order, so as to sort the to-be-picked-up item of the first quantity from the material container of the first order according to the second sorting instruction; and a third sorting instruction generation module, configured to: after the target material container is transported to the buffer area, generate a third sorting instruction of the target material container, so as to sort a substitute item corresponding to a difference between the first quantity and the second quantity from the target material container according to the third sorting instruction.

Optionally, the material container of the first order in the buffer area includes a material container of the first order on a buffer shelf and/or a material container of the first order in a storage unit of the third target robot.

Optionally, the material container of the first order in the buffer area is the material container of the first order in the storage unit of the third target robot, and a robot implementing the first transport strategy is a robot other than the third target robot.

Optionally, the apparatus further includes: an order priority determining module, configured to: before obtaining the material container of the first order in the buffer area, obtain an initial grade and a deadline of the second order; and determine the priority of the second order according to the initial grade and the deadline of the second order.

The order processing apparatus provided in this embodiment of the present disclosure can execute the order processing method provided in any embodiment of the present disclosure, and has corresponding functional modules and beneficial effects for executing the method.

FIG. 9 is a schematic structural diagram of an order processing device according to an embodiment of the present disclosure. As shown in FIG. 9, the order processing device includes: a memory 910, a processor 920, and a computer program.

The computer program is stored in the memory 910 and is configured to be executed by the processor 920 to implement the order processing method provided in any one of the embodiments corresponding to FIG. 3 to FIG. 7 of the present disclosure.

The memory 910 and the processor 920 are connected through a bus 930.

Relevant descriptions can be understood by referring to the relevant descriptions and effects corresponding to the steps in FIG. 3 to FIG. 7, and details are not repeated herein.

FIG. 10 is a schematic structural diagram of a warehousing system according to an embodiment of the present disclosure. As shown in FIG. 10, the warehousing system includes: a robot 1010, a shelf 1020, and an order processing device 1030.

The order processing device 1030 is the order processing device in the embodiment corresponding to FIG. 9 of the present disclosure; the robot 1010 is configured to pick up, from the shelf 1020 according to an instruction of the order processing device 1030, a material container corresponding to the instruction, so as to complete a corresponding order.

An embodiment of the present disclosure provides a computer-readable storage medium on which a computer program is stored, and the computer program is executed by a processor to implement the order processing method provided by any one of the embodiments corresponding to FIG. 3 to FIG. 7 of the present disclosure.

The computer-readable storage medium may be a ROM, a random access memory (RAM), a CD-ROM, a magnetic tape, a floppy disk, an optical data storage device, and the like.

The present disclosure further provides a program product including executable instructions stored in a readable storage medium. At least one processor of the order processing device or a warehousing management device can read the execution instructions from the readable storage medium, and the at least one processor executes the execution instructions so that the order processing apparatus implements the order processing method provided by the above-mentioned various embodiments.

In the embodiments provided in the present disclosure, it should be understood that the disclosed device and method may be implemented in other manners. For example, the described device embodiment is merely an example. For example, the module division is merely logical function division. In actual implementation, there may be another division manner. For example, multiple modules may be combined or integrated into another system, or some features may be ignored or not performed. In addition, the displayed or discussed mutual coupling or direct coupling or communication connection may be through some interfaces, indirect coupling or communication connection of the apparatus or module, and may be in an electrical, mechanical, or another form.

The modules described as separate parts may or may not be physically separate, and parts displayed as modules may or may not be physical units, that is, may be located in one place, or may be distributed on multiple network units. Some or all of the modules may be selected based on an actual requirement to implement the objectives of the solutions in the embodiments.

In addition, functional units in the embodiments of the present disclosure may be integrated into one processing unit, or each module may exist separately physically, or two or more modules may be integrated into one unit. The foregoing modular units may be implemented in a form of hardware, or may be implemented in a form of a hardware plus a software function module.

The above-mentioned integrated modules implemented in the form of a software function module may be stored in a computer-readable storage medium. The above-mentioned software functional module is stored in a storage medium, and includes several instructions to enable a computer device (which may be a personal computer, a server, or a network device, etc.) or a processor (English: processor) to execute some steps of the method in various embodiments of the present disclosure.

It should be understood that the above-mentioned processor may be a central processing unit (Central Processing Unit, CPU for short), and may also be other general-purpose processors, digital signal processors (Digital Signal Processor, DSP for short), application-specific integrated circuits (Application-Specific Integrated Circuit, ASIC for short) and so on. The general-purpose processor may be a microprocessor, or the processor may be any conventional processor or the like. Steps of the methods disclosed with reference to the present invention may be directly executed and accomplished through a hardware processor, or may be executed and accomplished by using a combination of hardware and software modules in the processor.

The memory may include a high-speed RAM memory, and may also include a non-volatile memory NVM, such as at least one disk storage, and may also be a USB flash drive, a mobile hard disk, a read-only memory, a magnetic disk, or an optical disk.

The bus may be an industry standard architecture (Industry Standard Architecture, ISA for short) bus, a peripheral component interconnect (Peripheral Component Interconnect, PCI for short) bus, or an extended industry standard architecture (Extended Industry Standard Architecture, EISA for short) bus. The bus can be divided into an address bus, a data bus, a control bus and so on. For ease of representation, the bus in the drawings of the present disclosure is not limited to only one bus or one type of bus.

The storage medium may be implemented by any type of volatile or non-volatile storage device or a combination thereof, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk. The storage medium may be any usable medium accessible to a general-purpose or special-purpose computer.

An exemplary storage medium is coupled to the processor, so that the processor can read information from the storage medium and can write information to the storage medium. Certainly, the storage medium may also be a component of the processor. The processor and the storage medium may be located in application-specific integrated circuits (Application-Specific Integrated Circuits, ASIC). Certainly, the processor and the storage medium may exist in an electronic device or a main control device as discrete components.

A person of ordinary skill in the art may understand that all or some of the steps of the method embodiments may be implemented by a program instructing relevant hardware. The program may be stored in a computer-readable storage medium. When the program is run, the steps of the method embodiments are performed. The foregoing storage medium includes any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, a person of ordinary skill in the art should understand that they may still make modifications to the technical solutions described in the foregoing embodiments or make equivalent replacements to some or all of technical features thereof, without departing from the scope of the technical solutions of the embodiments of the present disclosure.

What is claimed is:

1. An order processing method, comprising:
in a case that a second order is detected and a priority of the second order is higher than a priority of at least one first order, obtaining a material container of a first order in a buffer area, wherein the at least one first order is an order that is currently being executed and whose execution is not completed, and the material container of the first order is at least one material container of material containers corresponding to the at least one first order; and
determining a first transport strategy of the second order according to the material container of the first order and a requirement of the second order, so as to complete the second order according to the first transport strategy;
wherein the second order is an item pickup order, the requirement of the second order comprises at least one to-be-picked-up item and a quantity of the to-be-picked-up item in the second order, and the determining the first transport strategy of the second order according to the material container of the first order and the requirement of the second order comprises:
for each to-be-picked-up item, determining whether the material container of the first order comprises the to-be-picked-up item; and in a case that the material container of the first order does not comprise the to-be-picked-up item, generating the first transport strategy of the to-be-picked-up item according to the quantity of the to-be-picked-up item in the second order.

2. The method according to claim 1, wherein the second order is issued later than the first order.

3. The method according to claim 1, wherein after the second order is completed according to the first transport strategy, the method further comprises continuing to complete the first order;
wherein the material container of the first order in the buffer area that meets a requirement of the at least one first order is used to complete the second order; and
wherein the second order is completed earlier than the at least one first order is completed.

4. The method according to claim 1, further comprising:
in a case that the material container of the first order meets the requirement of the second order, determining that transport of the second order is completed; and
determining a second transport strategy of the first order according to the material container of the first order, a requirement of the at least one first order, and the requirement of the second order, so as to complete the at least one first order according to the second transport strategy.

5. The method according to claim 1, further comprising:
in a case that the material container of the first order comprises the to-be-picked-up item, determining whether a quantity of the to-be-picked-up item in the material container of the first order is smaller than the quantity of the to-be-picked-up item in the second order; and
in a case that the quantity of the to-be-picked-up item in the material container of the first order is smaller than the quantity of the to-be-picked-up item in the second order, generating the first transport strategy of the to-be-picked-up item according to a difference between the quantity of the to-be-picked-up item in the material container of the first order and the quantity of the to-be-picked-up item in the second order.

6. The method according to claim 5, further comprising:
in a case that the quantity of the to-be-picked-up item in the material container of the first order is greater than or equal to the quantity of the to-be-picked-up item in the second order, generating a sorting instruction of the to-be-picked-up item in the second order, so as to sort the quantity of the to-be-picked-up item in the second order from the material container of the first order according to the sorting instruction.

7. The method according to claim 5, further comprising:
in a case that the quantity of the to-be-picked-up item in the material container of the first order is less than the quantity of the to-be-picked-up item in the second order, generating a sorting instruction of the to-be-picked-up item in the second order, so as to sort the quantity of the to-be-picked-up item in the material container of the first order from the material container of the first order according to the sorting instruction; and
after a target material container is transported to the buffer area, generating a sorting instruction of the target material container, so as to sort a substitute item corresponding to a difference between the quantity of the to-be-picked-up item in the material container of the first order and the quantity of the to-be-picked-up item in the second order from the target material container according to the sorting instruction of the target material container.

8. The method according to claim 5, wherein the generating the first transport strategy of the to-be-picked-up item according to the difference between the quantity of the to-be-picked-up item in the material container of the first order and the quantity of the to-be-picked-up item in the second order comprises:

determining a target material container according to the difference between the quantity of the to-be-picked-up item in the material container of the first order and the quantity of the to-be-picked-up item in the second order;

determining a target transport robot;

determining a priority of the target transport robot according to the priority of the second order; and generating a material container transport instruction of the target transport robot according to material container information of the target material container, so that the target transport robot transfers the target material container to the buffer area based on the priority of the target transport robot according to the material container transport instruction of the target transport robot.

9. The method according to claim 1, wherein the material container of the first order in the buffer area comprises one or more of a material container of the first order on a buffer shelf and a material container of the first order in a storage unit of a target robot corresponding to the first order.

10. The method according to claim 9, wherein the material container of the first order in the buffer area is the material container of the first order in the storage unit of the target robot corresponding to the first order, and a robot implementing the first transport strategy is a robot other than the target robot corresponding to the first order.

11. The method according to claim 1, before obtaining the material container of the first order in the buffer area, further comprising:

obtaining an initial grade and a deadline of the second order; and determining the priority of the second order according to the initial grade and the deadline of the second order.

12. The method according to claim 1, wherein after the second order is completed according to the first transport strategy, the method further comprises continuing to complete the first order.

13. The method according to claim 12, wherein the second order is completed earlier than the at least one first order is completed.

14. The method according to claim 1, wherein the material container of the first order in the buffer area comprises a material container of the first order on a buffer shelf.

15. An order processing device, comprising: a memory and at least one processor; wherein the memory stores computer-executable instructions; and the at least one processor is configured to execute the computer-executable instructions stored in the memory to:

in a case that a second order is detected and a priority of the second order is higher than a priority of at least one first order, obtain a material container of a first order in a buffer area, wherein the at least one first order is an order that is currently being executed and whose execution is not completed, and the material container of the first order is at least one material container of material containers corresponding to the at least one first order; and determine a first transport strategy of the second order according to the material container of the first order and a requirement of the second order, so as to complete the second order according to the first transport strategy;

wherein the second order is an item pickup order, the requirement of the second order comprises at least one to-be-picked-up item and a quantity of the to-be-picked-up item in the second order, and when the at least one processor is configured to determine the first transport strategy of the second order according to the material container of the first order and the requirement of the second order, the at least one processor is configured to:

for each to-be-picked-up item, determine whether the material container of the first order comprises the to-be-picked-up item; and in a case that the material container of the first order does not comprise the to-be-picked-up item, generate the first transport strategy of the to-be-picked-up item according to the quantity of the to-be-picked-up item in the second order.

16. The order processing device according to claim 15, wherein after the second order is completed according to the first transport strategy, the at least one processor is further configured to continue to complete the first order;

wherein the material container of the first order in the buffer area that meets a requirement of the at least one first order is used to complete the second order; and wherein the second order is completed earlier than the at least one first order is completed.

17. A warehousing system, comprising:

an order processing device, comprising a memory and at least one processor; wherein the memory stores computer-executable instructions, the at least one processor is configured to execute the computer executable instructions stored in the memory to:

in a case that a second order is detected and a priority of the second order is higher than a priority of at least one first order, obtain a material container of a first order in a buffer area, wherein the at least one first order is an order that is currently being executed and whose execution is not completed, and the material container of the first order is at least one material container of material containers corresponding to the at least one first order; and determine a first transport strategy of the second order according to the material container of the first order and a requirement of the second order, so as to complete the second order according to the first transport strategy;

wherein the second order is an item pickup order, the requirement of the second order comprises at least one to-be-picked-up item and a quantity of the to-be-picked-up item in the second order, and when the at least one processor is configured to determine the first transport strategy of the second order according to the material container of the first order and the requirement of the second order, the at least one processor is configured to:

for each to-be-picked-up item, determine whether the material container of the first order comprises the to-be-picked-up item; and in a case that the material container of the first order does not comprise the to-be-picked-up item, generate the first transport strategy of the to-be-picked-up item according to the quantity of the to-be-picked-up item in the second order; and a robot, configured to pick up a material container corresponding to the first transport strategy according to an instruction of the order processing device.

18. The warehousing system according to claim 17, wherein after the second order is completed according to the first transport strategy, the at least one processor is further configured to continue to complete the first order;

wherein the material container of the first order in the buffer area that meets a requirement of the at least one first order is used to complete the second order; and wherein the second order is completed earlier than the at least one first order is completed.

19. A non-transitory computer-readable storage medium, wherein the computer-readable storage medium stores computer-executable instructions, the computer-executable instructions, when being executed by a computer, are configured to:

in a case that a second order is detected and a priority of the second order is higher than a priority of at least one first order, obtain a material container of a first order in a buffer area, wherein the at least one first order is an order that is currently being executed and whose execution is not completed, and the material container of the first order is at least one material container of material containers corresponding to the at least one first order; and determine a first transport strategy of the second order according to the material container of the first order and a requirement of the second order, so as to complete the second order according to the first transport strategy;

wherein when the computer-executable instructions are configured to determine the first transport strategy of the second order according to the material container of the first order and the requirement of the second order, the computer-executable instructions are further configured to:

determine whether the material container of the first order meets the requirement of the second order;

in a case that the material container of the first order does not meet the requirement of the second order, determine a to-be-transported material container according to the requirement of the second order and the material container of the first order; and determine the first transport strategy of the second order according to the to-be-transported material container;

wherein the computer-executable instructions are further configured to:

determine whether a remaining slot in the buffer area is smaller than a required slot of the to-be-transported material container;

in a case that the remaining slot in the buffer area is smaller than the required slot of the to-be-transported material container, according to a difference between the required slot and the remaining slot, determine a material container to be moved out of the buffer area, wherein the material container to be moved out is the material container of the first order that is located in the slot in the buffer area and that is not comprised in the requirement of the second order;

generate a move-out instruction of the material container to be moved out, so that a robot can move the material container to be moved out, out of the buffer area according to the move-out instruction; and after the material container to be moved out is moved out, generate an accommodating instruction of the to-be-transported material container, so as to accommodate the to-be-transported material container in the buffer area according to the accommodating instruction.

20. The non-transitory computer-readable storage medium according to claim 19, wherein when the computer-executable instructions are configured to determine the first transport strategy of the second order according to the to-be-transported material container, the computer-executable instructions are further configured to:

determine a target robot;

determine a priority of the target robot according to the priority of the second order; and generate a material container transport instruction of the target robot according to material container information of the to-be-transported material container, so that the target robot transports the to-be-transported material container based on the priority of the target robot and according to the material container transport instruction.

* * * * *